United States Patent [19]

Sotheran

[11] Patent Number: 5,689,313
[45] Date of Patent: Nov. 18, 1997

[54] BUFFER MANAGEMENT IN AN IMAGE FORMATTER

[75] Inventor: Martin William Sotheran, Dursley, Great Britain

[73] Assignee: Discovision Associates, Irvine, Calif.

[21] Appl. No.: 485,242

[22] Filed: Jun. 7, 1995

Related U.S. Application Data

[62] Division of Ser. No. 399,801, Mar. 7, 1995.

[30] Foreign Application Priority Data

Mar. 24, 1994 [GB] United Kingdom .................. 9405914

[51] Int. Cl.[6] ........................................................ G06F 12/00
[52] U.S. Cl. ........................... 348/715; 348/384; 348/513; 395/509; 395/872; 395/551; 395/558; 395/250
[58] Field of Search ................................. 348/112, 113, 348/512, 513, 526, 390, 384, 715; 358/339; 395/250, 550, 182.18, 876, 551, 557, 558, 509, 872; 370/94.2

[56] References Cited

U.S. PATENT DOCUMENTS

| | | | |
|---|---|---|---|
| 3,893,042 | 7/1975 | Whitman et al. | 331/55 |
| 3,962,685 | 6/1976 | Bell Isle | 340/172.5 |
| 4,142,205 | 2/1979 | Iinuma | 358/13 |
| 4,149,242 | 4/1979 | Pirz | 364/200 |
| 4,196,448 | 4/1980 | Whitehouse et al. | 358/135 |
| 4,215,369 | 7/1980 | Iijima | 358/146 |
| 4,334,246 | 6/1982 | Saran | 358/261 |
| 4,433,308 | 2/1984 | Hirata | 331/17 |
| 4,437,072 | 3/1984 | Asami | 331/1 A |
| 4,495,629 | 1/1985 | Zasio et al. | 377/70 |

(List continued on next page.)

FOREIGN PATENT DOCUMENTS

| | | |
|---|---|---|
| 0196911 | 8/1986 | European Pat. Off. . |
| 0255767 | 10/1988 | European Pat. Off. . |
| 0589734 | 3/1994 | European Pat. Off. . |
| 0639032 | 2/1995 | European Pat. Off. . |
| 2045035 | 10/1980 | United Kingdom . |
| 2059724 | 4/1981 | United Kingdom . |
| 2171578 | 8/1986 | United Kingdom . |
| 2194085 | 2/1988 | United Kingdom . |
| 2268035 | 12/1993 | United Kingdom . |
| 2269070 | 1/1994 | United Kingdom . |

OTHER PUBLICATIONS

Chong, "A Data Flow Architecture For Digital Image Processing," WesconTech. Papers No. 4/6, Oct. 30, 1984, Anaheim, California, USA, pp. 1–10.

P. Yip, et al., "DIT and DIF Algorithm for Discrete Sine and Cosine Transforms" Proceedings of the International Symposium on Circuits and Systems, IEEE Press, New York, US, vol. 2/3, 5 Jun. 1985, Kyoto, JP, pp. 941–944.

Hsieh S. Hou, "A Fast Recursive Algorithm for Computing the Discrete Cosine Transform," IEEE Transactions on Acoustics, Speech, and Signal Processing, vol. 35, No. 10, Oct. 1987, IEEE Press, New York, US, pp. 1455–1461.

Komori et al., "An Elastic Pipeline Mechanism By Self--Timed Circuits", IEEE Journal Of Solid–State Circuits, vol. 23, No. 1, Feb. 1988, New York, NY, USA, pp. 111–117.

A. Gupta et al., "A Fast Recursive Algorithm for the Discrete Sine Transform," IEEE Transactions on Acoustics, Speech, and Signal Processing, vol. 38, No. 3, Mar. 1990, IEEE Press, New York, US, pp. 554–557.

H.R. Wu, et al., "A Two Dimensional Fast Cosine Transform Algorithm Based on Hou's Approach," IEEE Transaction on Acoustics, Speech, and Signal Processing, vol. 39, No. 2, Feb. 1991, IEEE Press, New York, US, pp. 544–546.

Primary Examiner—Kenneth S. Kim
Attorney, Agent, or Firm—Ronald J. Clark; Robert T. Braun; Arthur S. Bickel

[57] ABSTRACT

This invention provides a method to control the buffering of encoded video data organized as frames or fields. This method involves determining the picture number of each incoming decoded frame, determining the expected presentation number at any time and marking any buffer as ready when its picture number is on or after the presentation number.

11 Claims, 3 Drawing Sheets

U.S. PATENT DOCUMENTS

| | | | |
|---|---|---|---|
| 4,540,903 | 9/1985 | Cooke et al. | 307/465 |
| 4,580,066 | 4/1986 | Berndt | 307/276 |
| 4,679,163 | 7/1987 | Arnould et al. | 364/725 |
| 4,785,349 | 11/1988 | Keith et al. | 358/136 |
| 4,789,927 | 12/1988 | Hannah | 364/200 |
| 4,799,677 | 1/1989 | Frederiksen | 273/1 E |
| 4,829,465 | 5/1989 | Knauer et al. | 364/725 |
| 4,831,440 | 5/1989 | Borgers et al. | 358/133 |
| 4,866,510 | 9/1989 | Goodfellow et al. | 358/13 |
| 4,894,823 | 1/1990 | Adelmann et al. | 370/252 |
| 4,910,683 | 3/1990 | Bishop et al. | 395/127 |
| 4,912,668 | 3/1990 | Aubie et al. | 364/725 |
| 4,922,341 | 5/1990 | Strobach | 358/136 |
| 4,924,298 | 5/1990 | Kitamura | 358/12 |
| 4,924,308 | 5/1990 | Feuchtwanger | 358/133 |
| 4,975,595 | 12/1990 | Roberts et al. | 307/272.2 |
| 5,003,204 | 3/1991 | Cushing et al. | 307/465 |
| 5,035,624 | 7/1991 | Hosoya et al. | 434/309 |
| 5,036,475 | 7/1991 | Ueda | 395/510 |
| 5,053,985 | 10/1991 | Friedlander et al. | 364/725 |
| 5,057,793 | 10/1991 | Cowley et al. | 331/1 A |
| 5,060,242 | 10/1991 | Arbeiter | 375/122 |
| 5,081,450 | 1/1992 | Lucas et al. | 340/728 |
| 5,086,489 | 2/1992 | Shimura | 382/56 |
| 5,107,345 | 4/1992 | Lee | 358/432 |
| 5,111,292 | 5/1992 | Kuriacose et al. | 358/133 |
| 5,113,255 | 5/1992 | Nagata et al. | 358/136 |
| 5,122,873 | 6/1992 | Golin | 358/133 |
| 5,122,875 | 6/1992 | Raychaudhuri et al. | 358/133 |
| 5,124,790 | 6/1992 | Nakayama | 358/133 |
| 5,126,842 | 6/1992 | Andrews et al. | 358/133 |
| 5,130,568 | 7/1992 | Miller et al. | 307/272.2 |
| 5,134,487 | 7/1992 | Taguchi et al. | 358/209 |
| 5,136,371 | 8/1992 | Savatier et al. | 358/133 |
| 5,142,380 | 8/1992 | Sakagami et al. | 358/432 |
| 5,146,325 | 9/1992 | Ng | 358/135 |
| 5,146,326 | 9/1992 | Hasegawa | 358/135 |
| 5,148,271 | 9/1992 | Kato et al. | 358/133 |
| 5,151,875 | 9/1992 | Sato | 364/784 |
| 5,151,997 | 9/1992 | Bailey et al. | 395/800 |
| 5,159,449 | 10/1992 | Allmendinger | 358/136 |
| 5,161,221 | 11/1992 | Van Nostrand | 395/484 |
| 5,164,819 | 11/1992 | Music | 358/13 |
| 5,168,356 | 12/1992 | Acampora et al. | 358/133 |
| 5,168,375 | 12/1992 | Reisch et al. | 358/432 |
| 5,172,011 | 12/1992 | Leuthold et al. | 307/272.2 |
| 5,174,641 | 12/1992 | Lim | 348/438 |
| 5,175,617 | 12/1992 | Wallace et al. | 358/133 |
| 5,185,819 | 2/1993 | Ng et al. | 382/56 |
| 5,189,526 | 2/1993 | Sasson | 358/432 |
| 5,191,548 | 3/1993 | Balkanski et al. | 364/725 |
| 5,193,002 | 3/1993 | Guichard et al. | 358/133 |
| 5,200,925 | 4/1993 | Morooka | 365/219 |
| 5,201,056 | 4/1993 | Daniel et al. | 395/800 |
| 5,202,847 | 4/1993 | Bolton et al. | 364/725 |
| 5,212,549 | 5/1993 | Ng et al. | 358/135 |
| 5,212,742 | 5/1993 | Normile et al. | 382/56 |
| 5,214,507 | 5/1993 | Aravind et al. | 358/133 |
| 5,216,724 | 6/1993 | Suzuki et al. | 382/7 |
| 5,223,926 | 6/1993 | Stone et al. | 358/133 |
| 5,227,863 | 7/1993 | Bilbrey et al. | 348/578 |
| 5,227,878 | 7/1993 | Puri et al. | 358/136 |
| 5,228,098 | 7/1993 | Crinon et al. | 382/56 |
| 5,231,484 | 7/1993 | Gonzales et al. | 358/133 |
| 5,231,486 | 7/1993 | Acampora et al. | 358/133 |
| 5,233,420 | 8/1993 | Piri et al. | 358/149 |
| 5,237,413 | 8/1993 | Israelsen et al. | 358/160 |
| 5,241,383 | 8/1993 | Chen et al. | 358/136 |
| 5,241,658 | 8/1993 | Masterson et al. | 395/162 |
| 5,249,146 | 9/1993 | Uramoto et al. | 364/725 |
| 5,253,058 | 10/1993 | Gharavi | 358/136 |
| 5,253,078 | 10/1993 | Balkanski et al. | 358/426 |
| 5,257,213 | 10/1993 | Kim et al. | 364/725 |
| 5,257,223 | 10/1993 | Dervisoglu | 365/154 |
| 5,258,725 | 11/1993 | Kinoshita | 331/17 |
| 5,260,781 | 11/1993 | Soloff et al. | 358/133 |
| 5,260,782 | 11/1993 | Hui | 358/133 |
| 5,276,513 | 1/1994 | van der Wal et al. | 358/136 |
| 5,276,784 | 1/1994 | Ohki | 395/127 |
| 5,278,520 | 1/1994 | Parker et al. | 331/1 A |
| 5,278,646 | 1/1994 | Civanlar et al. | 358/133 |
| 5,278,647 | 1/1994 | Hingorani et al. | 358/136 |
| 5,283,646 | 2/1994 | Bruder | 348/415 |
| 5,287,178 | 2/1994 | Acampora et al. | 348/384 |
| 5,287,182 | 2/1994 | Haskell et al. | 348/500 |
| 5,287,420 | 2/1994 | Barrett | 382/56 |
| 5,289,276 | 2/1994 | Siracusa et al. | 348/467 |
| 5,293,229 | 3/1994 | Iu | 348/415 |
| 5,294,894 | 3/1994 | Gebara | 331/1 A |
| 5,298,896 | 3/1994 | Lei et al. | 341/51 |
| 5,298,992 | 3/1994 | Pietras et al. | 348/415 |
| 5,299,025 | 3/1994 | Shirasawa | 358/400 |
| 5,300,949 | 4/1994 | Rodriguez et al. | 345/202 |
| 5,301,019 | 4/1994 | Citta | 348/416 |
| 5,301,032 | 4/1994 | Hong et al. | 358/261.2 |
| 5,301,040 | 4/1994 | Hoshi et al. | 358/465 |
| 5,301,136 | 4/1994 | McMillan, Jr. et al. | 364/725 |
| 5,301,272 | 4/1994 | Atkins | 395/165 |
| 5,304,953 | 4/1994 | Heim et al. | 331/1 A |
| 5,305,438 | 4/1994 | MacKay et al. | 395/164 |
| 5,309,527 | 5/1994 | Ohki | 382/56 |
| 5,343,218 | 8/1994 | Maeda | 345/116 |
| 5,351,047 | 9/1994 | Behlen | 341/67 |
| 5,357,606 | 10/1994 | Adams | 395/517 |
| 5,369,418 | 11/1994 | Richards | 345/185 |
| 5,384,598 | 1/1995 | Rodriguez et al. | 348/384 |
| 5,384,745 | 1/1995 | Konishi et al. | 365/230.03 |
| 5,386,537 | 1/1995 | Asano | 395/484 |
| 5,396,497 | 3/1995 | Veltman | 370/100.1 |
| 5,396,592 | 3/1995 | Fujimoto | 395/501 |
| 5,425,061 | 6/1995 | Laczko, Sr. et al. | 375/371 |
| 5,426,606 | 6/1995 | Takai | 365/189.05 |
| 5,430,488 | 7/1995 | Hedley | 348/446 |
| 5,448,568 | 9/1995 | Delpuch et al. | 370/94.2 |
| 5,457,482 | 10/1995 | Rhoden et al. | 345/201 |
| 5,467,137 | 11/1995 | Zdepski | 348/423 |
| 5,481,307 | 1/1996 | Goldstein et al. | 348/384 |
| 5,495,291 | 2/1996 | Adams | 348/390 |
| 5,502,494 | 3/1996 | Auld | 348/426 |
| 5,502,573 | 3/1996 | Fujinami | 358/339 |
| 5,517,250 | 5/1996 | Hoogenboom et al. | 348/467 |
| 5,543,853 | 8/1996 | Haskell et al. | 348/497 |
| 5,559,999 | 9/1996 | Maturi et al. | 395/550 |

BUFFER MANAGEMENT IN AN IMAGE FORMATTER

CROSS REFERENCE TO RELATED APPLICATIONS

This Application is a division of application Ser. No. 08/399,801, filed Mar. 7, 1995.

The following applications assigned to the assignee hereof contain subject matter related to this application: Ser. Nos. 08/399,665, filed Mar. 7, 1995, now abandoned; 08/400,058, filed Mar. 7, 1995; 08/399,800, filed Mar. 7, 1995; 08/399,801, filed Mar. 7, 1995; 08/810,780, filed Mar. 5, 1997; 08/474,222, filed Jun. 7, 1995, now abandoned; 08/486,481, filed Jun. 7, 1995; 08/474,231, filed Jun. 7, 1995; 08/474,830, filed Jun. 7, 1995; 08/474,220, filed Jun. 7, 1995; 08/473,868, filed Jun. 7, 1995; 08/474,603, filed Jun. 7, 1995; 08/477,048, filed Jun. 7, 1995, now abandoned; 08/485,744, filed Jun. 7, 1995, now abandoned; 08/399,799, filed Mar. 7, 1995 now abandoned; 08/810,780, filed Mar. 5, 1997.

BACKGROUND OF THE INVENTION

The present invention is directed to an image formatting circuit, operating on video data encoded according to a plurality of framing rates and more particularly, to a method of flexibly controlling the buffering of video data in said circuit.

Previous buffer manager systems were hardwired to implement certain predetermined conversions, for example, 3-2 pulldown systems. The present buffer manager does not use a predefined sequence of replication or skipping of frames, as in conventional 3-2 pulldown systems, and thus any ratio of encoded frame rate and display frame rate can be accommodated. The present buffer manager is thus more flexible with respect to its strategy for dropping or duplicating frames in order to account for differences in the encoded data frame rate and the display frame rate.

SUMMARY OF THE INVENTION

The invention provides a method for buffering encoded video data organized as frames comprising determining the picture number of a frame, determining the desired presentation number of a frame and marking the buffer as ready when the picture number is on or after the desired presentation number.

Figure 1:
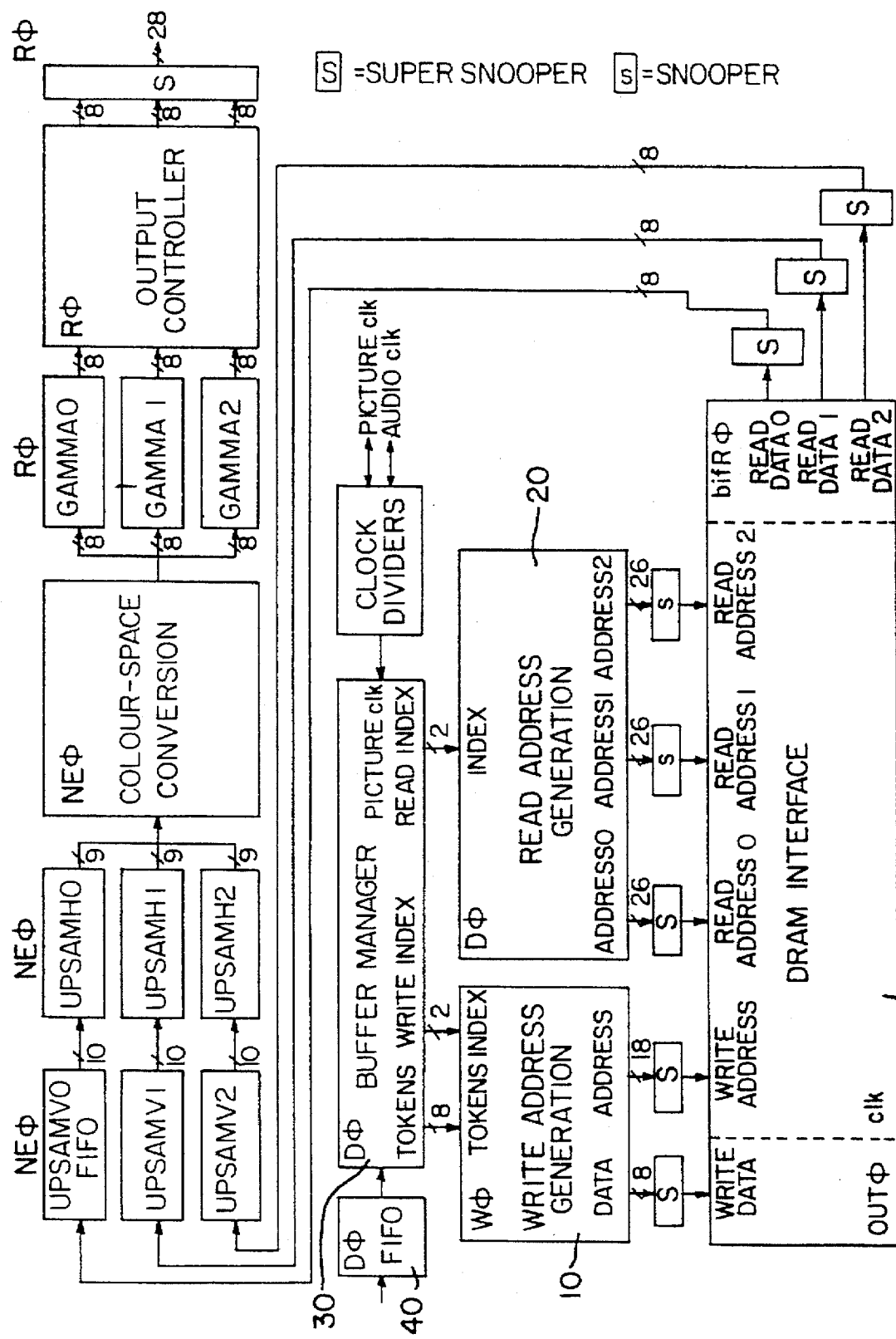
FIG. 1 is a block diagram of an image formatter.

Before one embodiment of the invention is explained in detail, it is to be understood that the invention is not limited in its application to the details of construction and the arrangement of components set forth in the following description or illustrated in the drawings. The invention is capable of other embodiments and of being practiced or carried out in various way. Also, it should be understood that the phraseology and terminology used herein is for the purpose of description and should not be regarded as limiting.

DETAILED DESCRIPTION OF THE INVENTION

An image formatter is shown in FIG. 1. There are two address generators, one for writing 10 and one for reading 20, a buffer manager 30 which supervises the two address generators 10 and 20 and provides frame-rate conversion, a data processing pipeline including vertical and horizontal upsamplers, color-space conversion and gamma correction, and a final control block which regulates the output of the processing pipeline.

Tokens provide an extensible format for communicating information through the chip-set. Each word of a Token is a minimum of 8 bits wide. A single Token can be spread over one or more words.

The extension bit indicates if a Token continues into another word. It is set to 1 in all words of a Token except the last one. If the first word of a Token has an extension bit of 0 this indicates that the Token is only one word long.

Each Token is identified by an Address Field that starts in bit 7 of the first word of the Token. The Address Field is of variable length and can potentially extend over multiple words (in the current chips no address is more than 8 bits long).

Some interfaces transfer more than 8 bits of data. The only Token that takes advantage of these extra bits is the Data Token. All other Tokens ignore the extra bits.

The Data Token carries data from one processing stage to the next. Consequently, the characteristics of this Token can change.

In some applications it may be necessary to design circuitry that connects directly to the output of a Spatial Decoder or Temporal Decoder. In most cases it will be sufficient to collect Data Tokens and to detect a few Tokens that provide synchronization information (such as PICTURESTART).

It is sufficient to observe activity on the extension bit to identify when each new Token starts. At this time the Address field can be tested to identify the Token. Unwanted or unrecognized Tokens can be consumed (and discarded) without knowledge of their content.

TABLE A.3.1

Summary of Tokens

| 7 | 6 | 5 | 4 | 3 | 2 | 1 | 0 | Token Name | Reference |
|---|---|---|---|---|---|---|---|---|---|
| 0 | 0 | 1 | | | | | | QUANT_SCALE | |
| 0 | 1 | 0 | | | | | | PREDICTION_MODE | |
| 0 | 1 | 1 | | | | | | (reserved) | |
| 1 | 0 | 0 | | | | | | MVD_FORWARDS | |
| 1 | 0 | 1 | | | | | | MVD_BACKWARDS | |
| 0 | 0 | 0 | 0 | 1 | | | | QUANT_TABLE | |
| 0 | 0 | 0 | 0 | 0 | 1 | | | Data | |

TABLE A.3.1-continued

Summary of Tokens

| 7 | 6 | 5 | 4 | 3 | 2 | 1 | 0 | Token Name | Reference |
|---|---|---|---|---|---|---|---|---|---|
| 1 | 1 | 0 | 0 | 0 | 0 |   |   | COMPONENT_NAME |  |
| 1 | 1 | 0 | 0 | 0 | 1 |   |   | DEFINE_SAMPLING |  |
| 1 | 1 | 0 | 0 | 1 | 0 |   |   | JPEG_TABLE_SELECT |  |
| 1 | 1 | 0 | 0 | 1 | 1 |   |   | MPEG_TABLE_SELECT |  |
| 1 | 1 | 0 | 1 | 0 | 0 |   |   | TEMPORAL_REFERENCE |  |
| 1 | 1 | 0 | 1 | 0 | 1 |   |   | MPEG_DCH_TABLE |  |
| 1 | 1 | 0 | 1 | 1 | 0 |   |   | (reserved) |  |
| 1 | 1 | 0 | 1 | 1 | 1 |   |   | (reserved) |  |
| 1 | 1 | 1 | 0 | 0 | 0 | 0 |   | (reserved) SAVE_STATE |  |
| 1 | 1 | 1 | 0 | 0 | 0 | 1 |   | (reserved) RESTORE_STATE |  |
| 1 | 1 | 1 | 0 | 0 | 1 | 0 |   | TIME_CODE |  |
| 1 | 1 | 1 | 0 | 0 | 1 | 1 |   | (reserved) |  |
| 0 | 0 | 0 | 0 | 0 | 0 | 0 | 0 | NULL |  |
| 0 | 0 | 0 | 0 | 0 | 0 | 0 | 1 | (reserved) |  |
| 0 | 0 | 0 | 0 | 0 | 0 | 1 | 0 | (reserved) |  |
| 0 | 0 | 0 | 0 | 0 | 0 | 1 | 1 | (reserved) |  |
| 0 | 0 | 0 | 1 | 0 | 0 | 0 | 0 | SEQUENCE_START |  |
| 0 | 0 | 0 | 1 | 0 | 0 | 0 | 1 | GROUP_START |  |
| 0 | 0 | 0 | 1 | 0 | 0 | 1 | 0 | PICTURE_START |  |
| 0 | 0 | 0 | 1 | 0 | 0 | 1 | 1 | SLICE_START |  |
| 0 | 0 | 0 | 1 | 0 | 1 | 0 | 0 | SEQUENCE_END |  |
| 0 | 0 | 0 | 1 | 0 | 1 | 0 | 1 | CODING_STANDARD |  |
| 0 | 0 | 0 | 1 | 0 | 1 | 1 | 0 | Picture-end |  |
| 0 | 0 | 0 | 1 | 0 | 1 | 1 | 1 | FLUSH |  |
| 0 | 0 | 0 | 1 | 1 | 0 | 0 | 0 | FIELD_INFO |  |
| 0 | 0 | 0 | 1 | 1 | 0 | 0 | 1 | MAX_COMP_ID |  |
| 0 | 0 | 0 | 1 | 1 | 0 | 1 | 0 | EXTENSION_Data |  |
| 0 | 0 | 0 | 1 | 1 | 0 | 1 | 1 | USER_Data |  |
| 0 | 0 | 0 | 1 | 1 | 1 | 0 | 0 | DHT_MARKER |  |
| 0 | 0 | 0 | 1 | 1 | 1 | 0 | 1 | DQT_MARKER |  |
| 0 | 0 | 0 | 1 | 1 | 1 | 1 | 0 | (reserved) DNL_MARKER |  |
| 0 | 0 | 0 | 1 | 1 | 1 | 1 | 1 | (reserved) DRI_MARKER |  |
| 1 | 1 | 1 | 0 | 1 | 0 | 0 | 0 | (reserved) |  |
| 1 | 1 | 1 | 0 | 1 | 0 | 0 | 1 | (reserved) |  |
| 1 | 1 | 1 | 0 | 1 | 0 | 1 | 0 | (reserved) |  |
| 1 | 1 | 1 | 0 | 1 | 0 | 1 | 1 | (reserved) |  |
| 1 | 1 | 1 | 0 | 1 | 1 | 0 | 0 | BIT_RATE |  |
| 1 | 1 | 1 | 0 | 1 | 1 | 0 | 1 | VBV_BUFFER_SIZE |  |
| 1 | 1 | 1 | 0 | 1 | 1 | 1 | 0 | VBV_DELAY |  |
| 1 | 1 | 1 | 0 | 1 | 1 | 1 | 1 | PICTURE_TYPE |  |
| 1 | 1 | 1 | 1 | 0 | 0 | 0 | 0 | PICTURE_RATE |  |
| 1 | 1 | 1 | 1 | 0 | 0 | 0 | 1 | PEL_ASPECT |  |
| 1 | 1 | 1 | 1 | 0 | 0 | 1 | 0 | HORIZONTAL_SIZE |  |
| 1 | 1 | 1 | 1 | 0 | 0 | 1 | 1 | VERTICAL_SIZE |  |
| 1 | 1 | 1 | 1 | 0 | 1 | 0 | 0 | BROKEN_CLOSED |  |
| 1 | 1 | 1 | 1 | 0 | 1 | 0 | 1 | CONSTRAINED |  |
| 1 | 1 | 1 | 1 | 0 | 1 | 1 | 0 | (reserved) SPECTRAL_LIMIT |  |
| 1 | 1 | 1 | 1 | 0 | 1 | 1 | 1 | DEFINE_MAX_SAMPLING |  |
| 1 | 1 | 1 | 1 | 1 | 0 | 0 | 0 | (reserved) |  |
| 1 | 1 | 1 | 1 | 1 | 0 | 0 | 1 | (reserved) |  |
| 1 | 1 | 1 | 1 | 1 | 0 | 1 | 0 | (reserved) |  |
| 1 | 1 | 1 | 1 | 1 | 0 | 1 | 1 | (reserved) |  |
| 1 | 1 | 1 | 1 | 1 | 1 | 0 | 0 | HORIZONTAL_MBS |  |
| 1 | 1 | 1 | 1 | 1 | 1 | 0 | 1 | VERTICAL_MBS |  |
| 1 | 1 | 1 | 1 | 1 | 1 | 1 | 0 | (reserved) |  |
| 1 | 1 | 1 | 1 | 1 | 1 | 1 | 1 | (reserved) |  |

Tokens arriving at the input to the image formatter are buffered in the FIFO 40 and transferred into the buffer manager 30. This block detects the arrival of new pictures and determines the availability of a buffer in which to store each one. If there is a buffer available, it is allocated to the arriving picture and its index is transferred to the write address generator 10 (also referred to herein as 'waddrgen'). If there is no buffer available, the incoming picture will be stalled until one does become free. All tokens are passed on to the write address generator 10. This operation is described in greater detail in U.K. Serial No. 9405914.4 filed on Mar. 24, 1994.

Each time the read address generator 20 (also referred to herein as 'dispaddr') receives a VSYNC signal from the display system, a request is made to the buffer manager 30 for a new display buffer index. If there is a buffer containing complete picture data, and that picture is deemed to be ready for display, that buffer's index will be passed to the display address generator. If not, the buffer manager sends the index of the last buffer to be displayed. At start-up, zero is passed as the index until the first buffer is full. A picture is deemed to be ready for display if its number (calculated as each picture is input) is greater than or equal to the picture number which is expected at the display (presentation number) given the encoding frame rate. The expected picture number is determined by counting picture clock pulses, where the picture clock pulses can be generated either locally by the clock dividers, or externally. This technology allows frame-rate conversion (e.g. 3-2 pull-down).

External DRAM is used for the buffers, which can be either two or three in number. Three are necessary if frame-rate conversion is to be effected.

The purpose of the buffer manager 30 is to supply the address generators with indices indicating any of either two or three external buffers for writing and reading of picture data. The allocation of these indices is influenced by three principal factors, each representing the effect of one of the timing regimes in operation: the rate at which picture data arrives at the input to image formatter (coded data rate), the rate at which data is displayed (display data rate), and the frame rate of the encoded video sequence (presentation rate).

A three-buffer system enables the presentation rate and the display rate to differ (e.g.3-2 pull-down), so that frames are either repeated or skipped as necessary to achieve the best possible sequence of frames given the timing constraints of the system. Pictures which present some difficulty in decoding may also be accommodated in a similar way, so that if a picture takes longer than the available display time to decode, the previous frame will be repeated while everything else 'catches up'. In a two-buffer system the three timing regimes must be locked—it is the third buffer which provides the flexibility for taking up slack.

The buffer manager operates by maintaining certain status information associated with each external buffer—this includes flags indicating if the buffer is in use, full of data, or ready for display, and the picture number within the sequence of the picture currently stored in the buffer. The presentation number is also recorded, this being a number which increments every time a picture clock pulse is received, and represents the picture number which is currently expected for display based on the frame rate of the encoded sequence.

An arrival buffer (a buffer to which incoming data will be written) is allocated every time a PICTURESTART token is detected at the input, and this buffer is then flagged as IN USE; on PICTUREEND, the arrival buffer will be de-allocated (reset to zero) and the buffer flagged as either FULL or READY depending on the relationship between the picture number and the presentation number.

The display address generator requests a new display buffer, once every vsync, via a two-wire-interface. If there is a buffer flagged as READY, then that will be allocated to display by the buffer manager. If there is no READY buffer, the previously displayed buffer will be repeated.

A two-wire valid/accept protocol is used at all levels in the chip-set to control the flow of information. Data is only transferred between blocks when both the sender and receiver are observed to be ready when the clock rises.

1) Data transfer
2) Receiver not ready
3) Sender not ready

If the sender is not ready the input of the receiver must wait. If the receiver is not ready the sender will continue to present the same data on its output until it is accepted by the receiver.

The width of the data word transferred by the two-wire interface varies depending upon the needs of the interface concerned.

In addition to the data signals there are three other signals:
.valid
.accept
.extension The extension signal corresponds to the Token extension bit. The two wire interface is intended for short range, point to point communication between chips. The clock distribution should be designed to minimize the clock skew between chips. If there is any clock skew it should be arranged so that receiving chips see the clock before sending chips. In a decoder the display interface of the Image Formatter can operate from a clock that is asynchronous to the main decoder clock. All chips communicating via two wire interfaces should operate from the same digital power supply.

Each time the presentation number changes this is detected and every buffer containing a complete picture is tested for READY-ness by examining the relationship between its picture number and the presentation number. Buffers are considered in turn, and when any is deemed to be READY this automatically cancels the READY-ness of any which was previously flagged as READY, this then being flagged as EMPTY. This works because later picture numbers are stored, by virtue of the allocation scheme, in the buffers that are considered later.

TEMPORALREFERENCE tokens in H261 cause a buffer's picture number to be modified if skipped pictures in the input stream are indicated. TEMPORALREFERENCE tokens in MPEG have no effect.

A FLUSH token causes the input to stall until every buffer is either EMPTY or has been allocated as the display buffer; presentation number and picture number are then reset and a new sequence can commence.

All data is input to the buffer manager from the input fifo, bmfront. This transfer takes place via a two-wire interface, the data being 8 bits wide plus an extension bit. All data arriving at the buffer manager is guaranteed to be complete tokens, a necessity for the continued processing of presentation numbers and display buffer requests in the event of significant gaps in the data upstream.

Tokens (8 bit data, 1 bit extension) are transferred to the write address generator via a two-wire interface. The arrival buffer index is also transferred on the same interface, so that the correct index is available for address generation at the same time as the PICTURESTART token arrives at waddrgen.

The interface to the read address generator comprises two separate two-wire interfaces which can be considered to act as 'request' and 'acknowledge' signals respectively—single wires are not adequate, however, because of the two two-wire-based state machines at either end.

The sequence of events normally associated with the dispaddr interface is as follows: dispaddr invokes a request, in response to a vsync from the display device, by asserting a signal (referred to herein as the 'drqvalid' input) to the buffer manager; when the buffer manager reaches an appropriate point in its state machine it will accept the request and go about allocating a buffer to be displayed; the dispvalid wire is then asserted, the buffer index is transferred, and this will normally be accepted immediately by dispaddr. There is an additional wire associated with this last two-wire-interface (rstfld) which indicates that the field number associated with the current index must be reset regardless of the previous field number.

The buffer manager block uses four bits of microprocessor address space, together with the 8-bit data bus and read and write strobes. There are two select signals, one indicating user-accessible locations and the other indicating test locations which should not require access under normal operation conditions.

The buffer manager is capable of producing two different events: index found and late arrival. The first of these is asserted when a picture arrives whose PICTURESTART extension byte (picture index) matches the value written into the BUBMTARGETIX register at setup. The second event occurs when a display buffer is allocated whose picture number is less than the current presentation number, i.e. the processing in the system pipeline up to the buffer manager has not managed to keep up with the presentation requirements.

Picture clock is the clock signal for the presentation number counter and is either generated on-chip or taken from an external source (normally the display system). The buffer manager accepts both of these signals and selects one based on the value of pclkext (a bit in the buffer manager's control register). This signal also acts as the enable for the pad picoutpad, so that if the Image Formatter is generating its own picture clock this signal is also available as an output from the chip.

Figure 2:
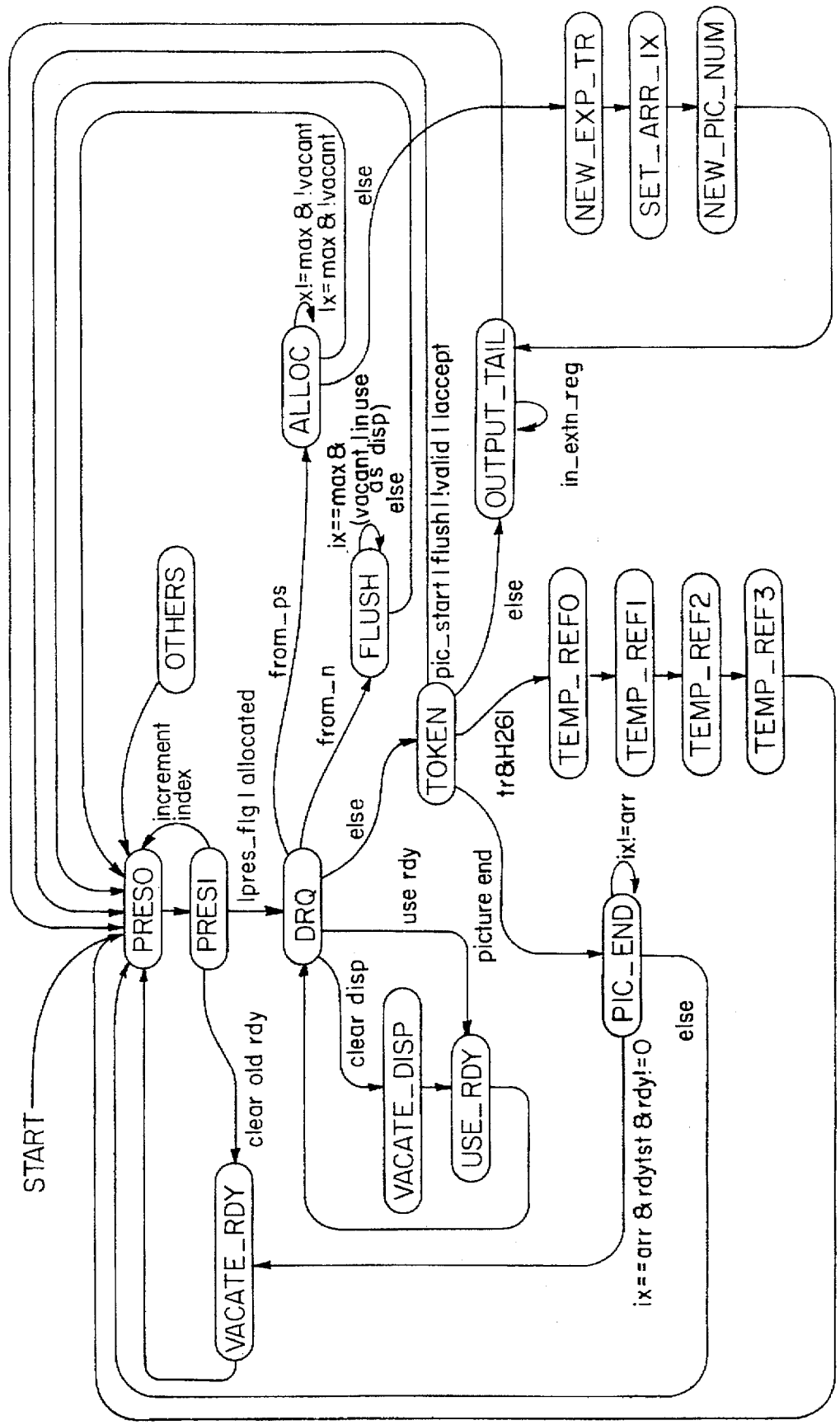
FIG. 2 is a diagram of the buffer manager state machine.

There are 19 states in the buffer manager's state machine. These interact as shown in FIG. 2. The reset state is PRES0, with flags set to zero such that the main loop is circulated initially.

Figure 3:
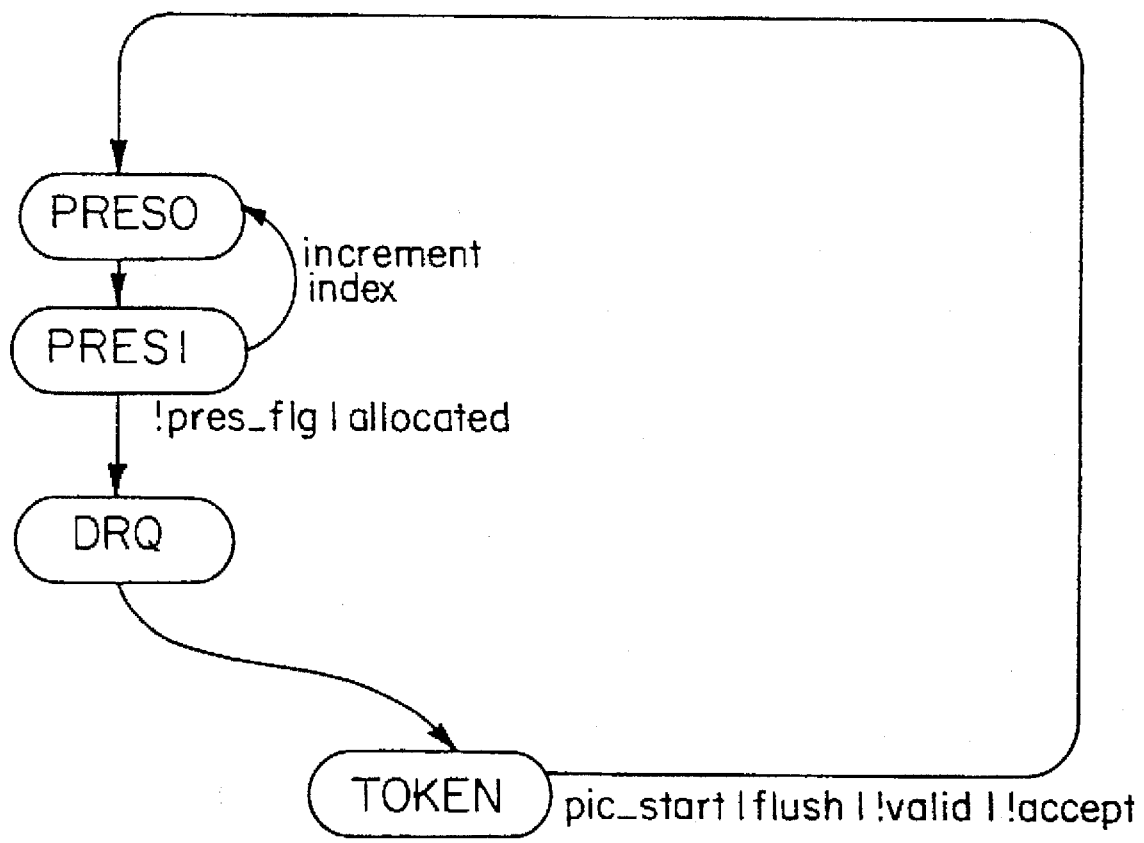
FIG. 3 illustrates the main loop of the state machine in FIG. 2.

The main loop of the state machine comprises the states shown in FIG. 3 (highlighted in the main diagram—FIG. 2). States PRES0 and PRES1 are concerned with detecting a picture clock via the signal presflg. Two cycles are allowed for the tests involved since they all depend on the value of rdytst. If a presentation flag is detected, all of the buffers are examined for possible 'readiness', otherwise the state machine just advances to state DRQ. Each cycle around the PRES0-PRES1 loop examines a different buffer, checking for full and ready conditions: if these are met, the previous ready buffer (if one exists) is cleared, the new ready buffer is allocated and its status is updated. This process is repeated until all buffers have been examined (index==max buf) and the state then advances. A buffer is deemed to be ready for display when any of the following is true:

(picnum>presnum)&&((picnum−presnum)>=128)

or (picnum<presnum)&&((presnum−picnum)<=128)

or picnum==presnum

State DRQ checks for a request for a display buffer (drq validreg && dispaccreg). If there is no request the state advances (normally to state TOKEN more on this later), otherwise a display buffer index is issued as follows: if there is no ready buffer, the previous index is re-issued or, if there is no previous display buffer, a null index (zero) is issued; if a buffer is ready for display, its index is issued and its state is updated—if necessary the previous display buffer is cleared. The state machine then advances as before.

State TOKEN is the usual option for completing the main loop: if there is valid input and the output is not stalled, tokens are examined for strategic values (described in later sections), otherwise control returns to state PRES0.

Control only diverges from the main loop when certain conditions are met. These are described in the following sections.

If during the PRES0-PRES1 loop a buffer is determined to be ready, any previous ready buffer needs to be vacated because only one buffer can be designated ready at any time. State VACATERDY clears the old ready buffer by setting its state to VACANT, and it resets the buffer index to 1 so that when control returns to the PRES0 state, all buffers will be tested for readiness. The reason for this is that the index is by now pointing at the previous ready buffer (for the purpose of clearing it) and there is no record of our intended new ready buffer index—it is necessary therefore to re-test all of the buffers.

Allocation of the display buffer index takes place either directly from state DRQ (state USERDY) or via state VACATEDISP which clears the old display buffer state. The chosen display buffer is flagged as INUSE, the value of rdy buf is set to zero, and the index is reset to 1 to return to state DRQ. dispbuf is given the required index and the two-wire interface wires (dispvalid and drqacc) are controlled accordingly. Control returns to state DRQ only so that the decision between states TOKEN, FLUSH and ALLOC does not need to be made in state USE RDY.

On receipt of a PICTUREEND token control transfers from state TOKEN to state PICTURE END where, if the index is not already pointing at the current arrival buffer, it is set to point there so that its status can be updated. Assuming both outaccreg and enfull are true, status can be updated as described below; if not, control remains in state PICTUREEND until they are both true. The enfull signal is supplied by the write address generator to indicate that the swing buffer has swung, i.e. the last block has been successfully written and it is therefore safe to update the buffer status.

The just-completed buffer is tested for readiness and given the status either FULL or READY depending on the result of the test. If it is ready, rdybuf is given the value of its index and the setlaev signal (late arrival event) is set high (indicating that the expected display has got ahead in time of the decoding). The new value of arrbuf now becomes zero, and, if the previous ready buffer needs its status clearing, the index is set to point there and control moves to state VACATERDY; otherwise index is reset to 1 and control returns to the start of the main loop.

When a PICTURESTART token arrives during state TOKEN, the flag fromps is set, causing the basic state machine loop to be changed such that state ALLOC is visited instead of state TOKEN. State ALLOC is concerned with allocating an arrival buffer (into which the arriving picture data can be written), and cycles through the buffers until it finds one whose status is VACANT. A buffer will only be allocated if outaccreg is high, since it is output on the data two-wire-interface, so cycling around the loop will continue until this is the case. Once a suitable arrival buffer has been found, the index is allocated to arrbuf and its status is flagged as INUSE. Index is set to 1, the flag fromps is reset, and the state is set to advance to NEWEXPTR. A check is made on the picture's index (contained in the word following the PICTURESTART) to determine if it the same as targix (the target index specified at setup) and, if so, set if ev (index found event) is set high.

The three states NEWEXPTR, SETARRIX and NEW PICNUM set up the new expected temporal reference and picture number for the incoming data—the middle state just sets the index to be arrbuf so that the correct picture number register is updated (note that thispnum is also updated). Control then goes to state OUTPUTTAIL which outputs data (assuming favorable two-wire interface signals) until a low extension is encountered, at which point the main loop is re-started. This means that whole data blocks (64 items) are output, within which there are no tests for presentation flag or display request.

A FLUSH token in the data stream indicates that sequence information (presentation number, picture number, rstfld) should be reset. This can only happen when all of the data leading up to the FLUSH has been correctly processed and so it is necessary, having received a FLUSH, to monitor the status of all of the buffers until it is certain that all frames have been handed over to the display, i.e. all but one of the buffers have status EMPTY, and the other is INUSE (as the display buffer). At that point a 'new sequence' can safely be started.

When a FLUSH token is detected in state TOKEN, the flag fromfl is set, causing the basic state machine loop to be changed such that state FLUSH is visited instead of state TOKEN. State FLUSH examines the status of each buffer in turn, waiting for it to become VACANT or INUSE as display. The state machine simply cycles around the loop until the condition is true, then increments its index and repeats the process until all of the buffers have been visited. When the last buffer fulfils the condition, presentation number, picture number and all of the temporal reference registers assume their reset values; rstfld is set to 1. The flag fromfl is reset and the normal main loop operation is resumed.

When a TEMPORALREFERENCE token is encountered, a check is made on the H261 bit and, if set, the four states TEMPREF0 to TEMPREF3 are visited. These perform the following operations:

TEMPREF0: tempref=indatareg;
TEMPREF1: delta=tempref−exptr; index =arrbuf;
TEMPREF2: exptr=delta+exptr;
TEMPREF3: picnum[i]=thispnum+delta;index=1;

State TOKEN passes control to state OUTPUTTAIL in all cases other than those outlined above. Control remains here until the last word of the token is encountered (inextnreg is low) and the main loop is then re-entered.

The requirement to repeatedly check for the 'asynchronous' timing events of picture clock and display buffer request, and the necessary to have the buffer manager input stalled during these checks, means that when there is a continuous supply of data at the input to the buffer manager there will be a restriction on the data rate through the buffer manager. A typical sequence of states may be PRES0, PRES1, DRQ, TOKEN, OUTPUTTAIL, each, with the exception of OUTPUTTAIL, lasting one cycle. This means that for each block of 64 data items, there will be an overhead of 3 cycles during which the input is stalled (during states PRES0, PRES1 and DRQ) thereby slowing the write rate by 3/64 or approximately 5%. This number may occasionally increase to up to 13 cycles overhead when auxiliary branches of the state machine are executed under worst-case conditions. Note that such large overheads will only apply on a once-per-frame basis.

Presentation number free-runs during upi accesses; if presentation number is required to be the same when access is relinquished as it was when access was gained, this can be effected by reading presentation number after access is granted, and writing it back just before it is relinquished. Note that this is asynchronous, so it may be necessary to repeat the accesses several times to be sure they are effective.

The write address generator 10 receives tokens from the buffer manager 30 and detects the arrival of each new DATA token. As each arrives, it calculates a new address for the DRAM interface 50 in which to store the arriving block. The raw data is then passed to the DRAM interface 50 where it is written in to a swing buffer. Note that DRAM addresses are block addresses, and pictures in the DRAM are organized as rasters of blocks. Incoming picture data, however, is organized as sequences of macroblocks, so the address generation algorithm must take account of this.

I claim:
1. An image formatter for processing encoded video data comprising:

an input element for receiving encoded data representing video frames, said data arriving as a sequence of tokens at an encoded frame rate for output or display at a display frame rate;

a memory defining at least three buffers for storage of the encoded data, wherein said received data is initially stored in a first said buffer;

a write address generator for generating addresses for data being stored in said first buffer;

a read address generator for generating addresses for reading data stored in said first buffer;

a presentation number counter;

an output interface linked to said read address generator that produces output data at said display frame rate; and a buffer manager responsive to control information in said tokens, to said encoded frame rate, and to said display frame rate, said buffer manager dynamically allocating and deallocating said at least three buffers as arrival buffers for reference by said write address generator, and as display buffers for reference by said read address generator, said buffer manager clearing said buffers for occupation by subsequently arriving data, and maintaining status information of said buffers, wherein said status information comprises a state VACANT, wherein a said buffer is available, a state INUSE, wherein a said buffer can be referenced by said write address generator, a state FULL, wherein a said buffer is occupied by data, and a state READY wherein a said buffer is reallocated as a display buffer;

wherein responsive to said presentation number counter and a current picture number contained in the encoded data said buffer manager asserts a late arrival signal indicating that a buffer in said state READY is not in synchronization with said display frame rate;

a state machine for controlling said buffer manager, said state machine transitioning among a plurality of states, including:
 a first transition from a first state PRES0, to a second state PRES1, wherein said status information of said buffers are evaluated;
 a second transition from said state PRES1 to a third state DRQ wherein a pending request for said display buffer is evaluated; and
 a third transition from said stage DRQ to a fourth state TOKEN, wherein tokens of received data are examined; whereby a status of said arrival buffer can be updated; and a plurality of 2-wire Interfaces each comprising: a sender a receiver, and a clock connected to said sender and said receiver, wherein data is transferred from said sender to said receiver upon a transition of said clock only when said sender is ready and said receiver is ready, wherein said buffer manager communicates with said read address generator, and with said write address generator via said 2-wire interfaces.

2. The image formatter according to claim 1, wherein said tokens each comprise a plurality of data words, said data words each including an extension bit which indicates a presence of additional words in said token.

3. The image formatter according to claim 1, wherein said plurality of states of said state machine further comprises:
a fifth state VACATERDY, wherein a ready state of a said buffer is cleared.

4. The image formatter according to claim 1, wherein said plurality of states of said state machine further comprises:

a sixth state VACATEDISP, wherein a state of said display buffer is cleared.

5. The image formatter according to claim 3, wherein said plurality of states of said state machine further comprises a seventh state USERDY, wherein allocation of a display buffer index occurs.

6. The image formatter according to claim 1, wherein said plurality of states of said state machine further comprises an eighth state PICTUREEND, wherein an index is set to a current arrival buffer.

7. The image formatter according to claim 1, wherein said plurality of states of said state machine further comprises a ninth state ALLOC, wherein an arrival buffer for new data is allocated.

8. The image formatter according to claim 2, wherein said plurality of states of said state machine further comprises a tenth state NEWEXP, an eleventh state NEWPICNUM, wherein an expected temporal reference and picture number are set up for incoming data.

9. The image formatter according to claim 7, wherein said plurality of states of said state machine further comprises a twelfth state SETARRIX, wherein a picture number register is updated.

10. The image formatter according to claim 1, wherein said plurality of states of said state machine further comprises a thirteenth state OUTPUTTAIL, wherein data is output from the formatter.

11. The image formatter according to claim 1, wherein said plurality of states of said state machine further comprises a fourteenth state FLUSH, wherein said buffers become vacant or enter a state of use for display.

* * * * *

UNITED STATES PATENT AND TRADEMARK OFFICE
Certificate

Patent No. 5,689,313                                          Patented: November 18, 1997

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Martin William Sotheran and Helen Rosemary Finch, both of Bristol, United Kingdom.

Signed and Sealed this Third Day of December 2002.

EDDIE P. CHAN
*Supervisory Patent Examiner*
Art Unit 2183